(12) United States Patent
Hwang et al.

(10) Patent No.: US 9,163,705 B1
(45) Date of Patent: Oct. 20, 2015

(54) PLANETARY GEAR TRAIN OF AUTOMATIC TRANSMISSION FOR VEHICLES

(71) Applicant: Hyundai Motor Company, Seoul (KR)

(72) Inventors: Seongwook Hwang, Gunpo-Si (KR); Seongwook Ji, Ansan-Si (KR); Myeonghoon Noh, Seongnam-Si (KR); Kangsoo Seo, Yongin-Si (KR); Jaechang Kook, Hwaseong-Si (KR); Won-jun Sung, Seoul (KR); Wonmin Cho, Hwaseong-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/557,337

(22) Filed: Dec. 1, 2014

(30) Foreign Application Priority Data

Sep. 23, 2014 (KR) .......................... 10-2014-0126787

(51) Int. Cl.
*F16H 3/66* (2006.01)
(52) U.S. Cl.
CPC .......... *F16H 3/66* (2013.01); *F16H 2200/0078* (2013.01); *F16H 2200/0082* (2013.01); *F16H 2200/2015* (2013.01); *F16H 2200/2046* (2013.01)

(58) Field of Classification Search
CPC ............... F16H 3/44; F16H 3/62; F16H 3/66; F16H 3/663; F16H 2200/0078; F16H 2200/2015; F16H 2200/2046
See application file for complete search history.

(56) References Cited

U.S. PATENT DOCUMENTS

| | | | | |
|---|---|---|---|---|
| 4,205,563 A * | 6/1980 | Gorrell | ........................... | 475/59 |
| 4,228,697 A * | 10/1980 | Miller | ........................... | 475/276 |
| 4,531,428 A * | 7/1985 | Windish | ........................ | 475/279 |
| 5,924,951 A * | 7/1999 | Winzeler et al. | .............. | 475/275 |
| 2013/0203547 A1 | 8/2013 | Singh | | |

FOREIGN PATENT DOCUMENTS

JP   5479518 B2   4/2014
KR   10-1063503 B1   9/2011

* cited by examiner

*Primary Examiner* — Huan Le
(74) *Attorney, Agent, or Firm* — Morgan, Lewis & Bockius LLP

(57) ABSTRACT

A planetary gear train of an automatic transmission may include an input shaft, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a fifth planetary gear set including a fifth sun gear, a fifth planetary carrier, and a fifth ring gear, first to ninth rotational shafts, and six friction elements selectively connecting the rotational shafts and the rotational shaft and the transmission housing.

6 Claims, 4 Drawing Sheets

FIG. 2

|     | C1 | C2 | C3 | B1 | B2 | B3 |      | Gear ratio of each step | Gear ratio |
|-----|----|----|----|----|----|----|------|------|------|
| 1ST  |    | ●  |    |    | ●  | ●  | 1ST  | 6.59 | 1.68 |
| 2ND  |    |    |    | ●  | ●  | ●  | 2ND  | 3.92 | 1.37 |
| 3RD  |    | ●  |    | ●  |    | ●  | 3RD  | 2.86 | 1.2  |
| 4TH  | ●  |    |    | ●  |    | ●  | 4TH  | 2.38 | 1.46 |
| 5TH  | ●  | ●  |    |    |    | ●  | 5TH  | 1.63 | 1.24 |
| 6TH  | ●  |    | ●  |    |    | ●  | 6TH  | 1.31 | 1.31 |
| 7TH  | ●  | ●  | ●  |    |    |    | 7TH  | 1    | 1.3  |
| 8TH  | ●  |    | ●  | ●  |    |    | 8TH  | 0.77 | 1.08 |
| 9TH  |    | ●  | ●  | ●  |    |    | 9TH  | 0.71 | 1.11 |
| 10TH |    |    | ●  | ●  | ●  |    | 10TH | 0.64 | 1.1  |
| 11TH |    | ●  | ●  |    | ●  |    | 11TH | 0.58 | 1.29 |
| 12TH | ●  |    | ●  |    | ●  |    | 12TH | 0.45 | 1st/12th:14.64 |
| REV  | ●  |    |    |    | ●  | ●  | REV  | -6.21 |      |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2014-0126787 filed on Sep. 23, 2014, the entire contents of which is incorporated herein for all purposes by this reference.

BACKGROUND OF THE INVENTION

1. Field of the Invention

The present invention relates to an automatic transmission for vehicles, and more particularly, to a planetary gear train of an automatic transmission for vehicles that implements a forward 12-speed by a minimum configuration to improve power transmission performance and reduce fuel efficiency.

2. Description of Related Art

In recent years, a rise in oil price causes dashing into unlimited competition for enhancing fuel efficiency.

As a result, researches into reduction of a weight and the enhancement of the fuel efficiency through down sizing are conducted in the case of an engine and researches for simultaneously securing operability and fuel efficiency competitiveness through multistages are conducted in the case of an automatic transmission.

However, in the automatic transmission, as a transmission step increases, the number of internal components increases, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

In this aspect, in recent years, 8 and 9-speed automated transmissions tend to be implemented and the research and development of a planetary gear train capable of implementing more transmission steps has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles that implements forward 12-speed and reverse 1-speed transmission steps with a minimum configuration and reduces drag torque by minimizing non-operated friction elements while three friction elements operate in respective transmission steps to improve power transmission performance and reduce fuel efficiency.

An aspect of the present invention provides a planetary gear train of an automatic transmission for vehicles including an input shaft into which power of an engine is input, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a fifth planetary gear set including a fifth sun gear, a fifth planetary carrier, and a fifth ring gear, a first rotational shaft configured to include the first sun gear and selectively connected to a transmission housing, a second rotational shaft configured to include the first and second planetary carriers and the third ring gear, a third rotational shaft configured to include the first and second ring gears and selectively connected to the transmission housing, a fourth rotational shaft configured to include the second sun gear and selectively connected to an input shaft, a fifth rotational shaft configured to include the third planetary carrier and the fourth ring gear and selectively connected to the fourth rotational shaft, a sixth rotational shaft configured to include the third sun gear and selectively connected to the input shaft, a seventh rotational shaft configured to include the fourth planetary carrier and the fifth ring gear and selectively connected to the input shaft, an eighth rotational shaft configured to include the fifth planetary carrier and directly connected to an output member, a ninth rotational shaft configured to include the fourth and fifth sun gears and selectively connected to the transmission housing, and six friction elements selectively connecting the rotational shafts and the rotational shaft and the transmission housing.

Each of the first, third, fourth and fifth planetary gear sets may be configured by a single-pinion planetary gear set, and the second planetary gear set may be configured by a double-pinion planetary gear set.

The planetary gear sets may be disposed in the order of the first, second, third, fourth, and fifth planetary gear sets from an engine side.

The planetary gear sets may be disposed in the order of the first, second, third, fifth, and fourth planetary gear sets from the engine side.

Each of the sixth friction elements may include a first clutch interposed between the input shaft and the fourth rotational shaft, a second clutch interposed between the fourth rotational shaft and the fifth rotational shaft, a third clutch interposed between the input shaft and the seventh rotational shaft, a first brake interposed between the first rotational shaft and the transmission housing, a second brake interposed between the third rotational shaft and the transmission housing, and a third brake interposed between the ninth rotational shaft and the transmission housing.

A transmission step implemented by selectively operating the six friction elements may include a first forward transmission step implemented by simultaneously operating the second clutch and the second and third brakes, a second forward transmission step implemented by simultaneously operating the first, second, and third brakes, a third forward transmission step implemented by simultaneously operating the second clutch and the first and third brakes, a fourth forward transmission step implemented by simultaneously operating the first clutch and the first and third brakes, a fifth forward transmission step implemented by simultaneously operating the first and second clutches and the third brake, a sixth forward transmission step implemented by simultaneously operating the first and third clutches and the third brake, a seventh forward transmission step implemented by simultaneously operating the first, second, and third clutches, an eighth forward transmission step implemented by simultaneously operating the first and third clutches and the first brake, a ninth forward transmission step implemented by simultaneously operating the second and third clutches and the first brake, a tenth forward transmission step implemented by simultaneously operating the third clutch and the first and second brakes, an eleventh forward transmission step implemented by simultaneously operating the second and third clutches and the second brake, a twelfth forward transmission step implemented by simultaneously operating the first and third clutches and the second brake, and a reverse transmission step implemented by simultaneously operating the first clutch and the second and third brakes.

According to exemplary embodiments of the present invention, forward 12-speed transmission steps and a reverse 1-speed transmission step are implemented by combining five planetary gear sets configured by simple planetary gear sets with six friction elements to improve power transmission performance and fuel efficiency.

Drag torque is reduced by minimizing non-operated friction elements while three friction elements operate to decrease a power loss.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective friction elements applied to the planetary gear train according to the various exemplary embodiments of the present invention.

Figure 1:
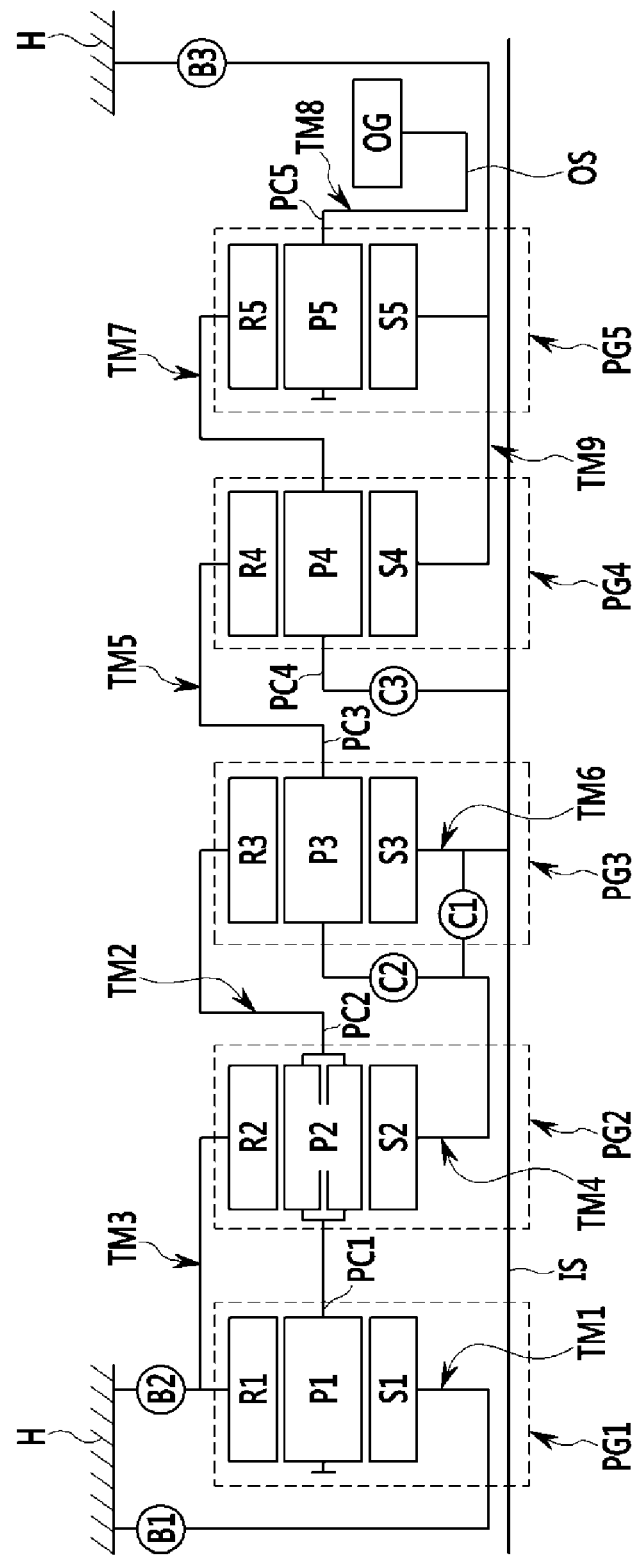
FIG. 1 is a configuration diagram of a planetary gear train according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a configuration diagram of a planetary gear train according to a first exemplary embodiment of the present invention.

Referring to FIG. 1, the planetary gear train according to the first exemplary embodiment of the present invention includes an input shaft IS, first, second, third, fourth, and fifth planetary gear sets PG1, PG2, PG3, PG4, and PG5 disposed on the input shaft IS, an output shaft OS, nine rotational shafts TM1 to TM9 directly connecting to each other respective rotation elements of the first, second, third, fourth, and fifth planetary gear sets PG1, PG2, PG3, PG4, and PG5, six friction elements C1 to C3 and B1 to B3, and a transmission housing H.

As a result, rotational power input from the input shaft IS is transmitted by an inter-complementation operation of the first, second, third, fourth, and fifth planetary gear sets PG1, PG2, PG3, PG4, and PG5 to be output through an output shaft OS.

In addition, the respective simple planetary gear sets are disposed in the order of the first, second, third, fourth, and fifth planetary gear sets PG1, PG2, PG3, PG4, and PG5 from an engine side.

The input shaft IS is an input member and rotational power from a crankshaft of an engine is torque-converted through a torque converter to be input into the input shaft IS.

The output shaft OS as an output member is disposed on the same axial line as the input shaft IS and directly connected with an output gear at a rear side to transfer transmitted driving power to a driving shaft through a differential.

The first planetary gear set PG1 as a single-pinion planetary gear set includes a first sun gear S1, a first planetary carrier PC1 that rotatably supports a first pinion P1 which outer-engages with the first sun gear S1, and a first ring gear R1 which inner-engages with the first pinion P1 as rotation elements.

The second planetary gear set PG2 as a double-pinion planetary gear set includes a second sun gear S2, a second planetary carrier PC2 that rotatably supports a second pinion P2 which outer-engages with the second sun gear S2, and a second ring gear R2 which inner-engages with the second pinion P2.

The third planetary gear set PG3 as a single-pinion planetary gear set includes a third sun gear S3, a third planetary carrier PC3 that rotatably supports a third pinion P3 which outer-engages with the third sun gear S3, and a third ring gear R3 which inner-engages with the third pinion P3.

The fourth planetary gear set PG4 as a single-pinion planetary gear set includes a fourth sun gear S4, a fourth planetary carrier PC4 that rotatably supports a fourth pinion P4 which outer-engages with the fourth sun gear S4, and a fourth ring gear R4 which inner-engages with the fourth pinion P4.

The fifth planetary gear set PG5 as a single-pinion planetary gear set includes a fifth sun gear S5, a fifth planetary carrier PC5 that rotatably supports a fifth pinion P5 which outer-engages with the fifth sun gear S5, and a fifth ring gear R5 which inner-engages with the fifth pinion P5.

In the first, second, third, fourth, and fifth planetary gear sets PG1, PG2, PG3, PG4, and PG5, one or more rotation elements are directly connected to each other to operate with a total of nine rotational shafts TM1 to TM9.

Configurations of the nine rotational shafts TM1 to TM9 will be described below.

The first rotational shaft TM1 is configured to include the first sun gear S1 and operates as a fixation element while being selectively connected to the transmission housing H.

The second rotational shaft TM2 is configured to include the first and second planetary carriers PC1 and PC2, and the third ring gear R3.

The third rotational shaft TM3 is configured to include the first and second ring gears R1 and R2 and operates as the fixation element while being selectively connected to the transmission housing H.

The fourth rotational shaft TM4 is configured to include the second sun gear S2 and operates as an input element while being selectively connected with the input shaft IS.

The fifth rotational shaft TM5 is configured to include the third planetary carrier PC3 and the fourth ring gear R4 and selectively connected with the fourth rotational shaft TM4.

The sixth rotational shaft TM6 is configured to include the third sun gear S3 and directly connected with the input shaft IS to continuously operate as the input element.

The seventh rotational shaft TM7 is configured to include the fourth planetary carrier PC4 and the fifth ring gear R5 and operates as the input element while being selectively connected with the input shaft IS.

The eighth rotational shaft TM8 is configured to include the fifth planetary carrier PC5 and directly connected with the output shaft OS to continuously operate as an output element.

The ninth rotational shaft TM9 is configured to include the fourth and fifth sun gears S4 and 55 and operates as the fixation element while being selectively connected to the transmission housing H.

In addition, among the rotational shafts TM1 to TM9, three clutches C1, C2, and C3 which are friction elements are disposed at the input shaft IS or portions where the rotational shafts are selectively connected.

Further, among the rotational shafts TM1 to TM9, three brakes B1, B2, and B3 which are the friction elements are disposed at portions selectively connected to the transmission housing H.

Layout positions of the six friction elements C1 to C3 and B1 to B3 will be described below.

The first clutch C1 is interposed between the input shaft IS and the fourth rotational shaft TM4, and as a result, the input shaft IS and the fourth rotational shaft TM4 are selectively integrated with each other.

The second clutch C2 is interposed between the fourth rotational shaft TM4 and the fifth rotational shaft TM5, and as a result, the fourth rotational shaft TM4 and the fifth rotational shaft TM5 are selectively integrated with each other.

The third clutch C3 is interposed between the input shaft IS and the seventh rotational shaft TM7, and as a result, the input shaft IS and the seventh rotational shaft TM7 are selectively integrated with each other.

The first brake B1 is interposed between the first rotational shaft TM1 and the transmission housing H to allow the first rotational shaft TM1 to operate as a selective fixation element.

The second brake B2 is interposed between the third rotational shaft TM3 and the transmission housing H to allow the second rotational shaft TM3 to operate as the selective fixation element.

The third brake B3 is interposed between the ninth rotational shaft TM9 and the transmission housing H to allow the ninth rotational shaft TM9 to operate as the selective fixation element.

The respective friction elements constituted by the first, second, and third clutches C1, C2, and C3 and the first, second, and third brakes B1, B2, and B3 as described above may be configured by a multiple-disk hydraulic friction joining unit which are friction-joined by hydraulic pressure.

FIG. 2 is an operation table for each of transmission steps of respective friction elements applied to the planetary gear train according to the first exemplary embodiment of the present invention.

As illustrated in FIG. 2, in the planetary gear train according to the first exemplary embodiment of the present invention, while three friction elements operate in the respective transmission steps, transmission is performed.

A forward 1-speed transmission step 1ST is implemented by simultaneously operating the second clutch C2 and the second and third brakes B2 and B3.

A forward 2-speed transmission step 2ND is implemented by simultaneously operating the first, second, and third brakes B1, B2, and B3.

A forward 3-speed transmission step 3RD is implemented by simultaneously operating the second clutch C2 and the first and third brakes B1 and B3.

A forward 4-speed transmission step 4TH is implemented by simultaneously operating the first clutch C1 and the first and third brakes B1 and B3.

A forward 5-speed transmission step 5TH is implemented by simultaneously operating the first and second clutches C1 and C2 and the third brake B3.

A forward 6-speed transmission step 6TH is implemented by simultaneously operating the first and third clutches C1 and C3 and the third brake B3.

A forward 7-speed transmission step 7TH is implemented by simultaneously operating the first, second, and third clutches C1, C2, and C3.

A forward 8-speed transmission step 8TH is implemented by simultaneously operating the first and third clutches C1 and C3 and the first brake B1.

A forward 9-speed transmission step 9TH is implemented by simultaneously operating the second and third clutches C2 and C3 and the first brake B1.

A forward 10-speed transmission step 10TH is implemented by simultaneously operating the third clutch C3 and the first and second brakes B1 and B2.

A forward 11-speed transmission step 11TH is implemented by simultaneously operating the second and third clutches C2 and C3 and the second brake B2.

A forward 12-speed transmission step 12TH is implemented by simultaneously operating the first and third clutches C1 and C3 and the second brake B2.

A reverse transmission step REV is implemented by simultaneously operating the first clutch C1 and the second and third brakes B2 and B3.

Figure 3:
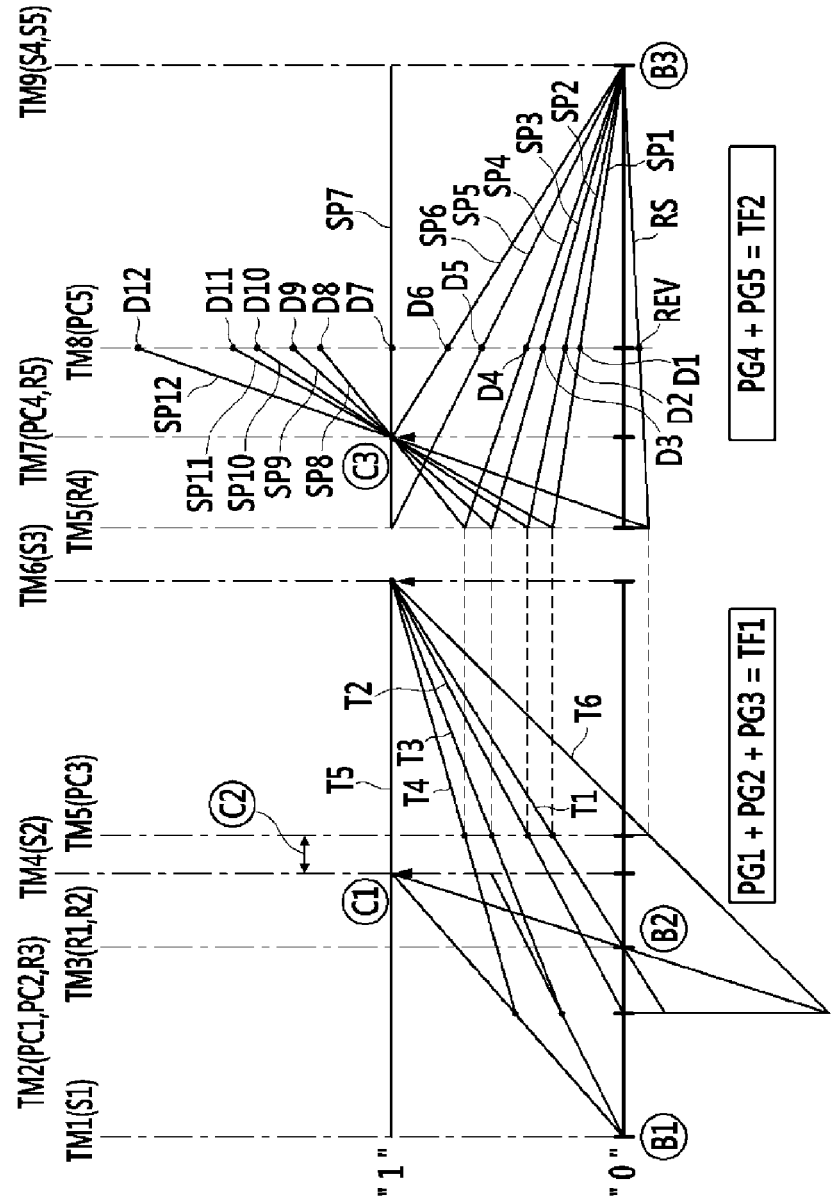
FIG. 3 is a transmission diagram of the planetary gear train according to the various exemplary embodiments of the present invention.

FIG. 3 is a transmission diagram for each transmission step of the planetary gear train according to the first exemplary embodiment of the present invention. A transmission process of the planetary gear train according to the first exemplary embodiment of the present invention is illustrated through a lever analysis method.

Referring to FIG. 3, six vertical lines by a combination of the first, second, and third planetary gear sets PG1, PG2, and PG3 is set as the first rotational shaft TM1, the second rotational shaft TM2, the third rotational shaft TM3, the fourth rotational shaft TM4, the fifth rotational shaft TM4, and the sixth rotational shaft TM5 from the left, and four vertical lines by a combination of the fourth and fifth planetary gear sets PG4 and PG5 are set as the fifth rotational shaft TM5, the seventh rotational shaft TM7, the eighth rotational shaft TM8, and the ninth rotational shaft TM9 from the left.

Further, a lower horizontal line represents a rotational speed of "0" and an upper horizontal line represents a rotational speed of "1".

In addition, the rotational speed of "1" assumes that a rotational speed of the input shaft IS is "1", and intervals of the vertical lines are set according to each gear ratio (the number of teeth of the sun gear/the number of teeth of the ring gear) of each of the planetary gear sets PG1 to PG5.

Further, since setting of a rotational axis of the vertical line is, of course, known to those skilled in the art of the planetary gear train, a detailed description thereof will be omitted.

Hereinafter, the transmission process for each transmission step of the planetary gear train according to the first exemplary embodiment of the present invention will be described with reference to FIGS. 2 and 3.

First, a complex planetary gear set configured by combining the first, second, and third planetary gear sets PG1, PG2, and PG3 becomes a first transmission unit TF1 that transmits rotational power input from the input shaft IS with six transmission ratios according to selective operations of the first and second clutches C1 and C2 and the first and second brakes B1 and B2 to output the transmitted rotational power through the fifth rotational shaft TM5.

In addition, a complex planetary gear set configured by combining the fourth and fifth planetary gear sets PG4 and PG5 becomes a second transmission unit TF2 that transmits six rotational powers input through the fifth rotational shaft TM5 with forward 12 speeds and a reverse 1 speed transmission steps by selective operations of the third clutch C3 and the third brake B3 to output the transmitted rotational powers through the eighth rotational shaft TM8 which is a final output member.

In the first transmission unit TF1, while a selective input is made into the fourth rotational shaft TM4 in the state where an input is continuously made into the sixth rotational shaft TM6, when a transmission process in which two friction elements operate in each of the shafts to perform the transmission is visually illustrated, six speed lines may be illustrated.

The first speed line T1 is associated with forward 1-speed and forward 11-speed transmissions while being formed when the second clutch C2 and the second brake B2 operate.

The second speed line T2 is associated with the forward 2-speed and forward 10-speed transmissions while being formed when the first brake B1 and the second brake B2 operate.

The third speed line T3 is associated with forward 3-speed and forward 9-speed transmissions while being formed when the second clutch C2 and the second brake B1 operate.

The fourth speed line T4 is associated with forward 4-speed and forward 8-speed transmissions while being formed when the second clutch C1 and the first brake B1 operate.

The fifth speed line T5 is associated with forward 5-speed and forward 7-speed transmissions while being formed when the first clutch C1 and the second clutch C2 operate.

The sixth speed line T6 is associated with forward 6-speed and forward 12-speed transmissions and the reverse transmission while being formed when the first clutch C1 and the third clutch C3 operate.

The transmission process for each transmission step of the planetary gear train according to the first exemplary embodiment of the present invention will be described with reference to the operation of the first transmission unit TF1.

[Forward 1-Speed]

Referring to FIG. 2, the second clutch C2, and the second and third brakes B2 and B3 are operation-controlled in the forward 1-speed transmission step.

Then, as illustrated in FIG. 3, in the first transmission unit TF1, while the second clutch C2 and the second brake B2 operate, the first speed line T1 is formed and the transmitted rotational power is input into the second transmission unit TF2 through the fifth rotational shaft TM5.

In addition, in the second transmission unit TF2, while the input is made into the fifth rotational shaft TM5, the ninth rotational shaft TM9 operates as the fixation element by operating the third brake B3, and as a result, the forward 1-speed transmission which is output as large as D1 is performed through the eighth rotational shaft TM8 which is the output element while a first transmission line SP1 is formed.

[Forward 2-Speed]

In the forward 2-speed transmission step 2ND, an operation of the second clutch that operates in the forward 1-speed is cancelled and the first brake B1 operates.

Then, as illustrated in FIG. 3, in the first transmission unit TF1, while the first brake B1 and the second brake B2 operate, the second speed line T2 is formed and the transmitted rotational power is input into the second transmission unit TF2 through the fifth rotational shaft TM5.

In addition, in the second transmission unit TF2, while the input is made into the fifth rotational shaft TM5, the ninth rotational shaft TM9 operates as the fixation element by operating the third brake B3, and as a result, the forward 2-speed transmission which is output as large as D2 is performed through the eighth rotational shaft TM8 which is the output element while a second transmission line SP2 is formed.

[Forward 3-Speed]

In the forward 3-speed, the operation of the second clutch B2 that operates in the forward 2-speed is cancelled and the second clutch C2 operates.

Then, as illustrated in FIG. 3, in the first transmission unit TF1, while the second clutch C2 and the first brake B1 operate, the third speed line T3 is formed and the transmitted rotational power is input into the second transmission unit TF2 through the fifth rotational shaft TM5.

In addition, in the second transmission unit TF2, while the input is made into the fifth rotational shaft TM5, the ninth rotational shaft TM9 operates as the fixation element by operating the third brake B3, and as a result, the forward 3-speed transmission which is output as large as D3 is performed through the eighth rotational shaft TM8 which is the output element while a third transmission line SP3 is formed.

[Forward 4-Speed]

In the forward 4-speed, the operation of the second clutch C2 that operates in the forward 3-speed is cancelled and the first clutch C1 operates.

Then, as illustrated in FIG. 3, in the first transmission unit TF1, while the first clutch C1 and the second brake B2 operate, the fourth speed line T4 is formed and the transmitted rotational power is input into the second transmission unit TF2 through the fifth rotational shaft TM5.

In addition, in the second transmission unit TF2, while the input is made into the fifth rotational shaft TM5, the ninth rotational shaft TM9 operates as the fixation element by operating the third brake B3, and as a result, the forward 4-speed transmission which is output as large as D4 is performed through the eighth rotational shaft TM8 which is the output element while a fourth transmission line SP4 is formed.

[Forward 5-Speed]

In the forward 5-speed, the operation of the first brake B1 that operates in the forward 4-speed is cancelled and the second clutch C2 operates.

Then, as illustrated in FIG. 3, in the first transmission unit TF1, while the first and second clutches C1 and C2 operate, the fifth speed line T5 which is directly joined is formed and the transmitted rotational power is input into the second transmission unit TF2 through the fifth rotational shaft TM5.

In addition, in the second transmission unit TF2, while the input is made into the fifth rotational shaft TM5, the ninth rotational shaft TM9 operates as the fixation element by operating the third brake B3, and as a result, the forward 5-speed transmission which is output as large as D5 is performed through the eighth rotational shaft TM8 which is the output element while a fifth transmission line SP5 is formed.

[Forward 6-Speed]

In the forward 6-speed, the operation of the second clutch C2 that operates in the forward 5-speed is cancelled and the third clutch C3 operates.

Then, as illustrated in FIG. 3, in the second transmission unit TF2, while the input is made into the seventh rotational shaft TM7, the ninth rotational shaft TM9 operates as the fixation element by operating the third brake B3, and as a result, the forward 6-speed transmission which is output as large as D6 is performed through the eighth rotational shaft TM8 which is the output element while a sixth transmission line SP6 is formed.

In this case, in the first transmission unit TF1, idling is performed by a complementary operation of each rotational shaft, but does not directly influence the transmission.

[Forward 7-Speed]

In the forward 7-speed, the operation of the third brake B3 that operates in the forward 6-speed is cancelled and the second clutch C2 operates.

Then, as illustrated in FIG. 3, in the first transmission unit TF1, while the first and second clutches C1 and C2 operate, the fifth speed line T5 which is directly joined is formed and the transmitted rotational power is input into the second transmission unit TF2 through the fifth rotational shaft TM5.

In addition, in the second transmission unit TF2, while the input is made into the fifth rotational shaft TM5, the input is made by operating the third brake C3, and as a result, the forward 7-speed transmission which is output as large as D7 is performed through the eighth rotational shaft TM8 which is the output element while being directly joined like a seventh transmission line SP7.

[Forward 8-Speed]

In the forward 8-speed, the operation of the second clutch C2 that operates in the forward 7-speed is cancelled and the first brake B1 operates.

Then, as illustrated in FIG. 3, in the first transmission unit TF1, while the first clutch C1 and the first brake B1 operate, the fourth speed line T4 is formed and the transmitted rotational power is input into the second transmission unit TF2 through the fifth rotational shaft TM5.

In addition, in the second transmission unit TF2, while the input is made into the fifth rotational shaft TM5, the seventh rotational shaft TM7 operates as the input element by operating the third brake C3, and as a result, the forward 8-speed transmission which is output as large as D8 is performed through the eighth rotational shaft TM8 which is the input element while an eighth transmission line SP8 is formed.

[Forward 9-Speed]

In the forward 9-speed, the operation of the first clutch C1 that operates in the forward 8-speed is cancelled and the second clutch C2 operates.

Then, as illustrated in FIG. 3, in the first transmission unit TF1, while the second clutch C2 and the first brake B1 operate, the third speed line T3 is formed and the transmitted rotational power is input into the second transmission unit TF2 through the fifth rotational shaft TM5.

In addition, in the second transmission unit TF2, while the input is made into the fifth rotational shaft TM5, the seventh rotational shaft TM7 operates as the input element by operating the third brake C3, and as a result, the forward 9-speed transmission which is output as large as D9 is performed through the eighth rotational shaft TM8 which is the output element while a ninth transmission line SP9 is formed.

[Forward 10-Speed]

In the forward 10-speed, the operation of the second clutch C2 that operates in the forward 9-speed is cancelled and the second brake B2 operates.

Then, as illustrated in FIG. 3, in the first transmission unit TF1, while the first brake B1 and the second brake B2 operate, the second speed line T2 is formed and the transmitted rotational power is input into the second transmission unit TF2 through the fifth rotational shaft TM5.

In addition, in the second transmission unit TF2, while the input is made into the fifth rotational shaft TM5, the seventh rotational shaft TM7 operates as the input element by operating the third brake C3, and as a result, the forward 10-speed transmission which is output as large as D10 is performed through the eighth rotational shaft TM8 which is the output element while a tenth transmission line SP10 is formed.

[Forward 11-Speed]

In the forward 11-speed, the operation of the first brake B1 that operates in the forward 10-speed is cancelled and the second clutch C2 operates.

Then, as illustrated in FIG. 3, in the first transmission unit TF1, while the second clutch C2 and the second brake B2 operate, the first speed line T1 is formed and the transmitted rotational power is input into the second transmission unit TF2 through the fifth rotational shaft TM5.

In addition, in the second transmission unit TF2, while the input is made into the fifth rotational shaft TM5, the seventh rotational shaft TM7 operates as the input element by operating the third brake C3, and as a result, the forward 11-speed transmission which is output as large as D11 is performed through the eighth rotational shaft TM8 which is the output element while an eleventh transmission line SP11 is formed.

[Forward 12-Speed]

In the forward 12-speed, the operation of the second clutch C2 that operates in the forward 11-speed is cancelled and the first clutch C1 operates.

Then, as illustrated in FIG. 3, in the first transmission unit TF1, while the first clutch C1 and the second brake B2 operate, the sixth speed line T6 is formed and the transmitted rotational power is input into the second transmission unit TF2 through the fifth rotational shaft TM5.

In addition, in the second transmission unit TF2, while the input is made into the fifth rotational shaft TM5, the seventh rotational shaft TM7 operates as the input element by operating the third clutch C3, and as a result, the forward 12-speed transmission which is output as large as D12 is performed through the eighth rotational shaft TM8 which is the output element while a twelfth transmission line SP12 is formed.

[Reverse]

In the reverse transmission step, the first clutch C1, and the second and third brakes B2 and B3 operate.

Then, as illustrated in FIG. 3, in the first transmission unit TF1, while the first clutch C1 and the second brake B2 operate, the sixth speed line T6 is formed and the transmitted rotational power is input into the second transmission unit TF2 through the fifth rotational shaft TM5.

In addition, in the second transmission unit TF2, while the input is made into the fifth rotational shaft TM5, the ninth rotational shaft TM9 operates as the fixation element by operating the third brake B3, and as a result, the reverse transmission which is output as large as REV is performed through the eighth rotational shaft TM8 which is the output element while a reverse transmission line RS is formed.

As described above, in the planetary gear train according to the exemplary embodiment of the present invention, five planetary gear sets PG1, PG2, PG3, PG4, and PG5 may implement the forward 12-speed and reverse 1-speed transmission steps through the operation-control of three clutches C1, C2, and C3 and three brakes B1, B2, and B3.

As a result, the planetary gear train according to the first exemplary embodiment of the present invention may improve the power transmission efficiency and the fuel efficiency through the multistages of the automatic transmission.

In addition, three friction elements operate for each transmission step, and as a result, a friction drag loss is decreased by minimizing the number of friction elements which do not operate, thereby improving the power transmission efficiency and the fuel efficiency.

Figure 4:
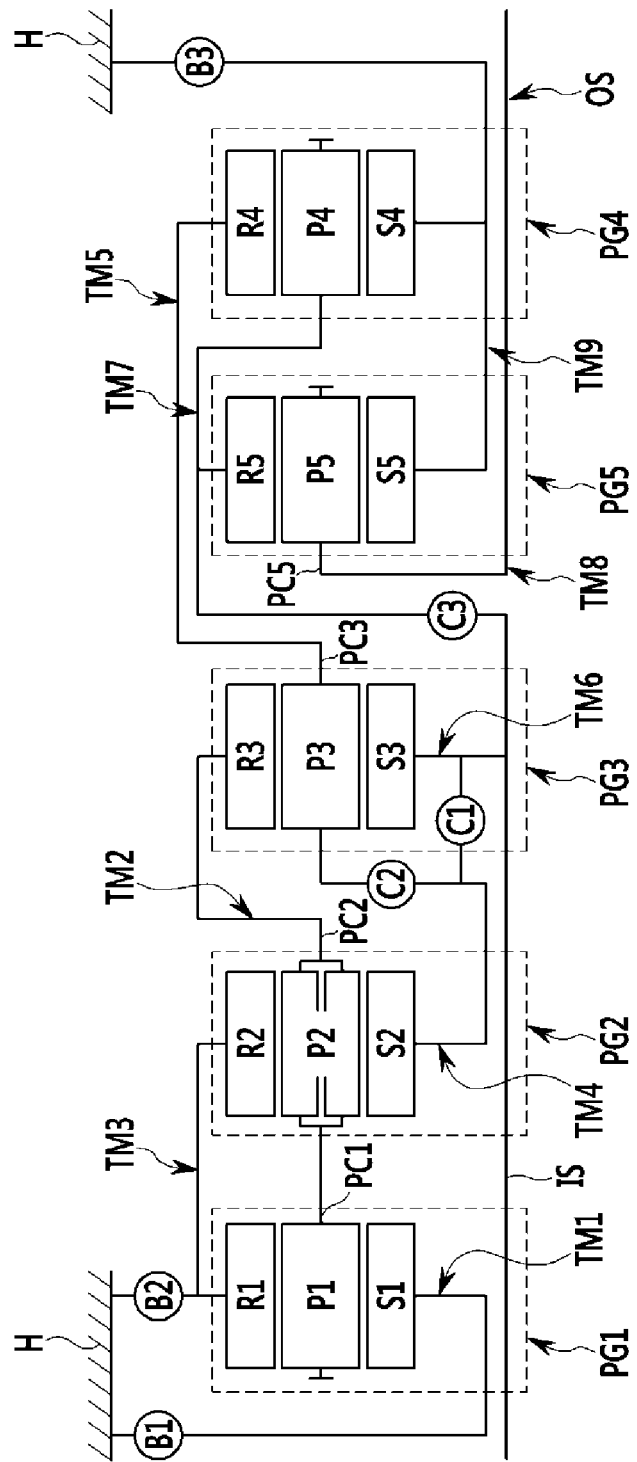
FIG. 4 is a configuration diagram of a planetary gear train according to various exemplary embodiments of the present invention.

FIG. 4 is a configuration diagram of a planetary gear train according to a second exemplary embodiment of the present invention.

Referring to FIG. 4, the output shaft OS and the output gear OG are disposed so as to be applied to a front-wheel driven vehicle in the first exemplary embodiment, but the output shaft OS is drawn out to a rear side so as to be applied to a rear-wheel driven vehicle in the second exemplary embodiment.

To this end, the fifth planetary gear set PG5 is disposed at a front side of the fourth planetary gear set PG4, and as a result, the output shaft OS connected with the eighth rotational shaft TM8 is disposed on the same axial line at the rear side of the input shaft IS and drawn out to the rear side to be connected with a drive shaft.

The second exemplary embodiment is the same as the first exemplary embodiment in terms of a configuration except for the configuration in which the fifth planetary gear set PG5 is disposed at the front side of the fourth planetary gear set PG4 and the output shaft OS connected with the eighth rotational shaft TM8 is disposed on the same axial line at the rear side of the input shaft IS and the transmission process, and as a result, a detailed description thereof will be omitted.

For convenience in explanation and accurate definition in the appended claims, the terms "upper", "lower", "inner" and "outer" are used to describe features of the exemplary embodiments with reference to the positions of such features as displayed in the figures.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

What is claimed is:

1. A planetary gear train of an automatic transmission for vehicles, comprising:
    an input shaft into which power of an engine is input;
    a first planetary gear set including a first sun gear, a first planetary carrier, and a first ring gear;
    a second planetary gear set including a second sun gear, a second planetary carrier, and a second ring gear;
    a third planetary gear set including a third sun gear, a third planetary carrier, and a third ring gear;
    a fourth planetary gear set including a fourth sun gear, a fourth planetary carrier, and a fourth ring gear;
    a fifth planetary gear set including a fifth sun gear, a fifth planetary carrier, and a fifth ring gear;
    a first rotational shaft including the first sun gear and selectively connected to a transmission housing;
    a second rotational shaft including the first and second planetary carriers and the third ring gear;
    a third rotational shaft including the first and second ring gears and selectively connected to the transmission housing;
    a fourth rotational shaft including the second sun gear and selectively connected to an input shaft;
    a fifth rotational shaft including the third planetary carrier and the fourth ring gear and selectively connected to the fourth rotational shaft;
    a sixth rotational shaft including the third sun gear and connected to the input shaft;
    a seventh rotational shaft including the fourth planetary carrier and the fifth ring gear and selectively connected to the input shaft;
    an eighth rotational shaft including the fifth planetary carrier and directly connected to an output member;
    a ninth rotational shaft including the fourth and fifth sun gears and selectively connected to the transmission housing; and
    six friction elements each selectively connecting one of the first, the second, the third, the fourth, the fifth, the sixth, the seventh, the eighth, or the ninth rotational shafts with one other of the first, the second, the third, the fourth, the fifth, the sixth, the seventh, the eighth, the ninth rotational shafts, or the transmission housing.

2. The planetary gear train of claim 1, wherein each of the first, third, fourth and fifth planetary gear sets is configured by a single-pinion planetary gear set, and the second planetary gear set is configured by a double-pinion planetary gear set.

3. The planetary gear train of claim 1, wherein the planetary gear sets are disposed in the order of the first, second, third, fourth, and fifth planetary gear sets from an engine side.

4. The planetary gear train of claim 1, wherein the planetary gear sets are disposed in the order of the first, second, third, fifth, and fourth planetary gear sets from an engine side.

5. The planetary gear train of claim 1, wherein the six friction elements comprises:
    a first clutch interposed between the input shaft and the fourth rotational shaft;
    a second clutch interposed between the fourth rotational shaft and the fifth rotational shaft;
    a third clutch interposed between the input shaft and the seventh rotational shaft;
    a first brake interposed between the first rotational shaft and the transmission housing;
    a second brake interposed between the third rotational shaft and the transmission housing; and
    a third brake interposed between the ninth rotational shaft and the transmission housing.

6. The planetary gear train of claim 5, wherein a transmission step implemented by selectively operating the six friction elements includes:
- a first forward transmission step implemented by simultaneously operating the second clutch and the second and third brakes;
- a second forward transmission step implemented by simultaneously operating the first, second, and third brakes;
- a third forward transmission step implemented by simultaneously operating the second clutch and the first and third brakes;
- a fourth forward transmission step implemented by simultaneously operating the first clutch and the first and third brakes;
- a fifth forward transmission step implemented by simultaneously operating the first and second clutches and the third brake;
- a sixth forward transmission step implemented by simultaneously operating the first and third clutches and the third brake;
- a seventh forward transmission step implemented by simultaneously operating the first, second, and third clutches;
- an eighth forward transmission step implemented by simultaneously operating the first and third clutches and the first brake;
- a ninth forward transmission step implemented by simultaneously operating the second and third clutches and the first brake;
- a tenth forward transmission step implemented by simultaneously operating the third clutch and the first and second brakes;
- an eleventh forward transmission step implemented by simultaneously operating the second and third clutches and the second brake;
- a twelfth forward transmission step implemented by simultaneously operating the first and third clutches and the second brake; and
- a reverse transmission step implemented by simultaneously operating the first clutch and the second and third brakes.

* * * * *